United States Patent [19]

Nüssli et al.

[11] Patent Number: 4,464,708
[45] Date of Patent: Aug. 7, 1984

[54] LIGHTING FIXTURE

[75] Inventors: Armin Nüssli, Rodersdorf; Hans-Peter Hauser, Allschwil, both of Switzerland

[73] Assignee: Bron Electronic AG, Allschwill, Switzerland

[21] Appl. No.: 415,153

[22] Filed: Sep. 7, 1982

[30] Foreign Application Priority Data

Sep. 25, 1981 [DE] Fed. Rep. of Germany ... 8128057[U]

[51] Int. Cl.³ .............................................. F21V 7/00
[52] U.S. Cl. ...................... 362/300; 362/17; 362/223; 362/224; 362/301; 362/346; 362/375; 362/360; 362/355; 362/297
[58] Field of Search .................... 362/16, 17, 367, 360, 362/223, 125, 224, 301, 297, 346, 355, 375, 300

[56] References Cited

U.S. PATENT DOCUMENTS

| | | | |
|---|---|---|---|
| 427,986 | 5/1890 | Gwynn | 362/367 |
| 3,167,256 | 1/1965 | Elliott | 362/17 |
| 3,696,785 | 10/1972 | Richard | 362/101 |
| 3,878,385 | 4/1975 | Kingston | 362/17 |
| 4,045,665 | 8/1977 | Williams | 362/355 |
| 4,356,533 | 10/1982 | Takematsu | 362/17 |
| 4,356,540 | 10/1982 | Goralnik | 362/367 |

FOREIGN PATENT DOCUMENTS 2032606  5/1980  United Kingdom ................ 362/367

Primary Examiner—Stephen J. Lechert, Jr.
Assistant Examiner—Howard J. Locker
Attorney, Agent, or Firm—Horst M. Kasper

[57] ABSTRACT

A lighting fixture which comprises a light reflecting fixture case having a transparent wall disposed next to an opening to provide light outflow, a light source disposed in the fixture case, and a diffuser wall covering the light outflow providing opening of the case and which is attached to the transparent wall and which reaches to at least the outer face of the transparent case wall. Thus the face of the diffuser wall can completely be used as light providing surface. Preferably, the transparent case wall is covered with a thin layer of reflecting and opaque material.

11 Claims, 4 Drawing Figures

LIGHTING FIXTURE

BACKGROUND OF THE INVENTION

1. Field of the Invention

The present invention relates to a lighting fixture with a reflecting light fixture case with at least one light source and a diffuser wall, which covers a light outflow opening of the case and which is attached to the wall of the case.

2. Brief Description of the Background of the Invention Including Prior Art

Such lighting fixtures are for example employed in photographic studios and film studios for illumination of the object to be photographed, but in addition also in exhibition rooms or the like for the illumination of certain parts of a room. According to the conventional lighting fixtures the diffuser wall is edged by the edge of the casing and thereby covered at its edges. The frame reduces the area useful as an illuminating surface of the diffuser wall. With a predetermined size of the lighting fixture thus results a corresponding smaller illuminating surface. In addition, it is not possible to combine several illuminating surfaces to a uniformly illuminating surface, since the shadows formed by the edges of the individual illuminating surfaces are disturbing.

SUMMARY OF THE INVENTION

1. Purposes of the Invention

It is an object of the present invention to enlarge the effective area of the diffuser wall in lighting fixtures without having to enlarge the outer diameters of the lighting fixture.

It is another object of the present invention to provide a lighting fixture which is adapted to be joined with other such lighting fixtures to form a substantially homogeneous illuminating surface.

It is a further object of the present invention to provide a lighting fixture with essentially transparent walls from plastic covered on their outside with a reflection material.

These and other objects and advantages of the present invention will become evident from the description which follows.

2. Brief Description of the Invention

The present invention provides a lighting fixture which comprises a light reflecting fixture case having a transparent wall disposed next to an opening to provide light outflow, a light source disposed in the fixture case, and a diffuser wall covering the light outflow providing opening of the case and attached to the transparent wall and reaching to at least the outer face of the adjacent transparent case wall.

The light source can be a flash lamp. The diffuser wall can be joining with its edge on all sides flush to the case wall, which overall comprises transparent material and which is provided with a reflecting and opaque covering. The diffuser wall can be attached to the front of the case wall, preferably by way of an adhesive. The adjacently disposed faces of the case wall and the diffuser wall can be mitred to each other along joint edges. Alternatively, the case wall with its front edges can make a butt connection to the inner face of the diffuser wall.

The case wall can comprise a transparent plastic material. The diffuser wall can comprise a white opal plastic material. The outer face of the case wall can be provided with a reflecting layer and this reflecting layer can be covered from the outside by an opaque covering layer. The reflecting layer and the covering layer can be colored layers. The reflecting layer and the covering layer can be formed by the outer faces of a plastic foil, which is solidly attached to the outer face of the case wall.

According to the invention light fixture one can eliminate the conventionally usual frame over the edges of the diffuser wall and no shadow is produced at the connection between diffuser wall and case wall, since the supporting wall of the case comprises transparent material such that the reflection of the light and the sealing against outflow of light is achieved by way of a thin covering.

The diffuser wall can be illuminated therefor up to its outer edge in the edge region of the adjacent transparent wall of the case. The edge of the diffuser wall covering the front face of the case wall is thus employed as a light providing area. Preferably the light fixture is constructed such that the diffuser wall joins with its edge on all sides flush with the case wall, which overall is produced from transparent material and comprises a reflecting and light transmitting covering. In this embodiment the face of the diffuser wall is completely employed as a light providing surface and several lighting fixtures can be disposed next to each other for furnishing a larger illuminating surface, which provides over its full surface a uniform illumination without shadows. In this manner illuminating surfaces can be composed individually of various dimensions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which are shown several of the various possible embodiments of the present invention.

DESCRIPTION OF INVENTION AND PREFERRED EMBODIMENTS

In accordance with the present invention there is provided a lighting fixture and in particular a flash lamp comprising a reflecting lighting fixture case and at least one light source and a diffuser wall, which covers a light outflow opening of the case and which is attached to the case wall wherein the diffuser wall 3 reaches to at least the outer face 15 of adjoining case walls 6 to 8 made from transparent material, which is covered with an opaque covering.

Figure 1:
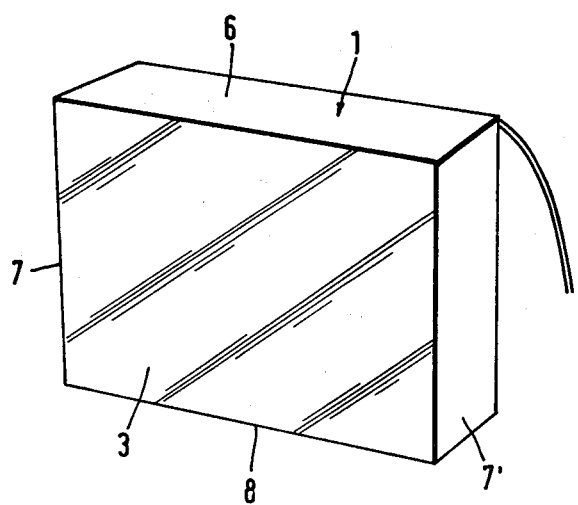
FIG. 1 is a perspective view of the lighting fixture according to the present invention.
Figure 2:
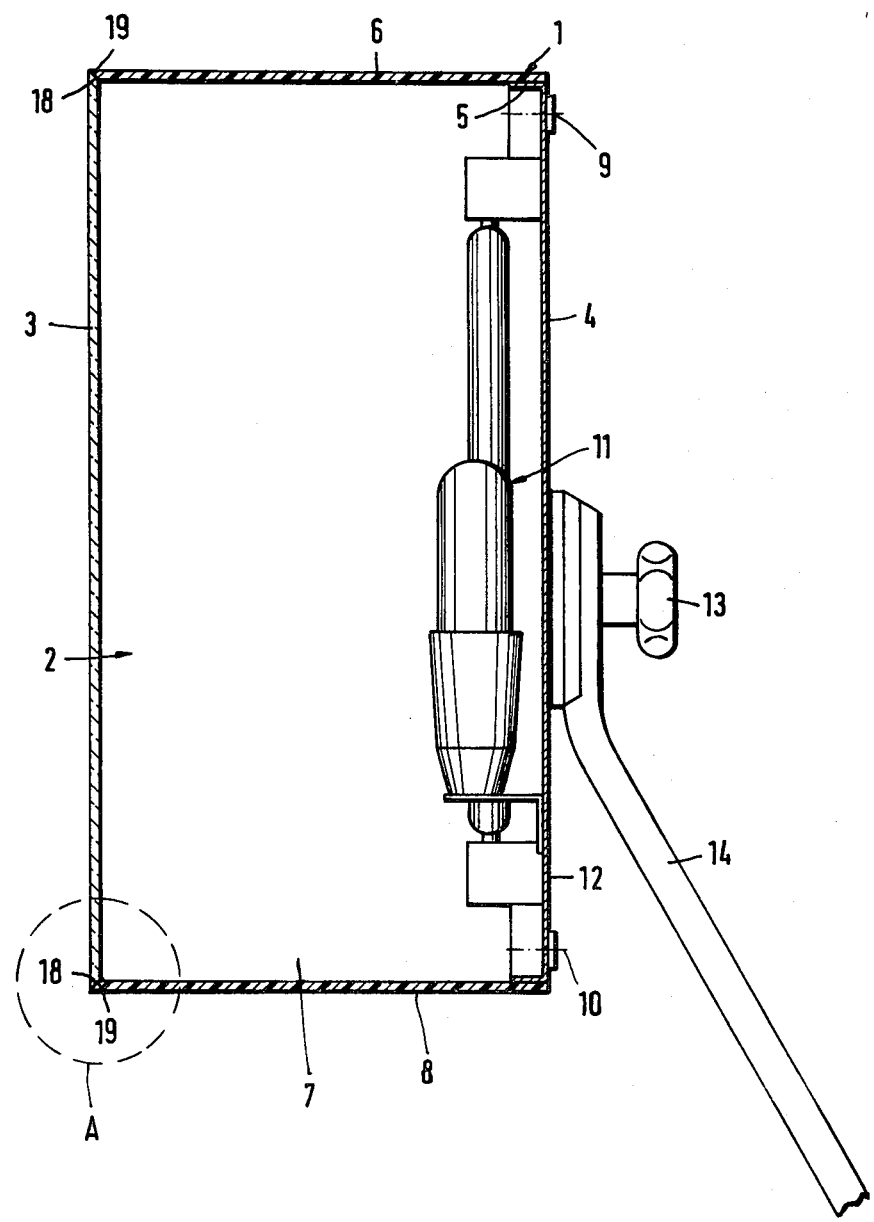
FIG. 2 is a sectional view of the lighting fixture of FIG. 1.

A lighting fixture is shown in FIGS. 1 and 2 where a lighting fixture case 1 is provided with a rectangular outline when viewed from the side. The open front face 2 of the case 1 is covered with a translucent wall 3 through which the light of a lamp 11 emerges diffusely. This diffuser wall 3 reaches with its outer edges on all sides to the outside face of the wall of the case 1, of which walls one can recognize in FIG. 1 the upper wall 6, the lower wall 8, and one of the side walls 7. The rearside case wall 4 is provided with a circumferentially running frame rim 5, with which it is inserted into the case such that the rear wall on its outside joins flush with the side wall. The rear wall 4 supports a light source 11, which is disposed within a reflector formed by the case 1 and which is for example a flash lamp or an incandescent lamp. The light source 11 can be attached to the rear wall by way of fastening elements 9, 10.

A support arm 14 is demountably attached by way of a clamping nut 13 to the outside 12 of the rear wall and the lighting fixture can for example be attached to a stand, pedestal, tripod or the like.

The case wall formed from the walls 6 to 8 and the second side wall 7 comprises light transmitting plastic such as for example materials from thermoplastic poly(-methyl methacrylate)-type polymers, which are commercially available under the trademark "Plexiglas". The wall is covered on its outside 15 completely with a reflecting layer 16.

This layer 16 can be provided by a paint coating, which is preferably white, but may also be any other reflecting color. In order to avoid that light passes through the case wall to the outside, a dark covering layer 17 is disposed on the reflecting layer 16, which is preferably a black covering coating. It is also possible to place a plastic foil on the outside 15 of the case wall instead of the color layers 16 and 17, and the inner side of the foil can be covered with a reflecting layer and the outside can be covered with an opaque covering layer.

Figure 3:
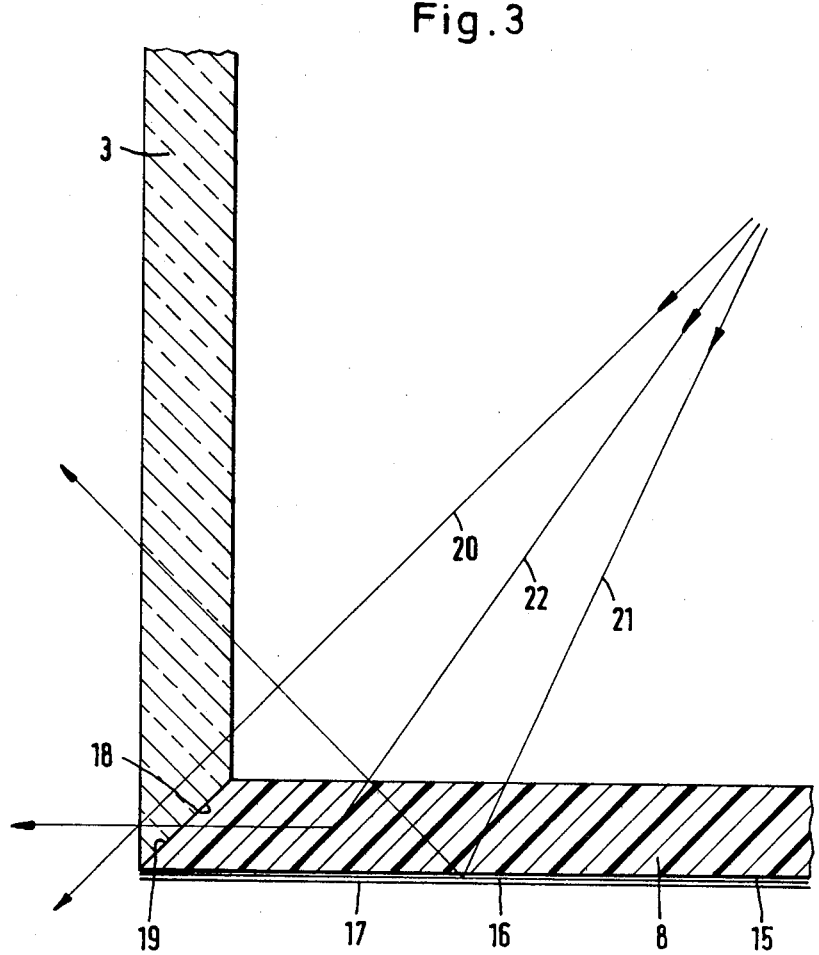
FIG. 3 is a view of an enlarged representation of the corner regions of the lighting fixture according to FIG. 2.
Figure 4:
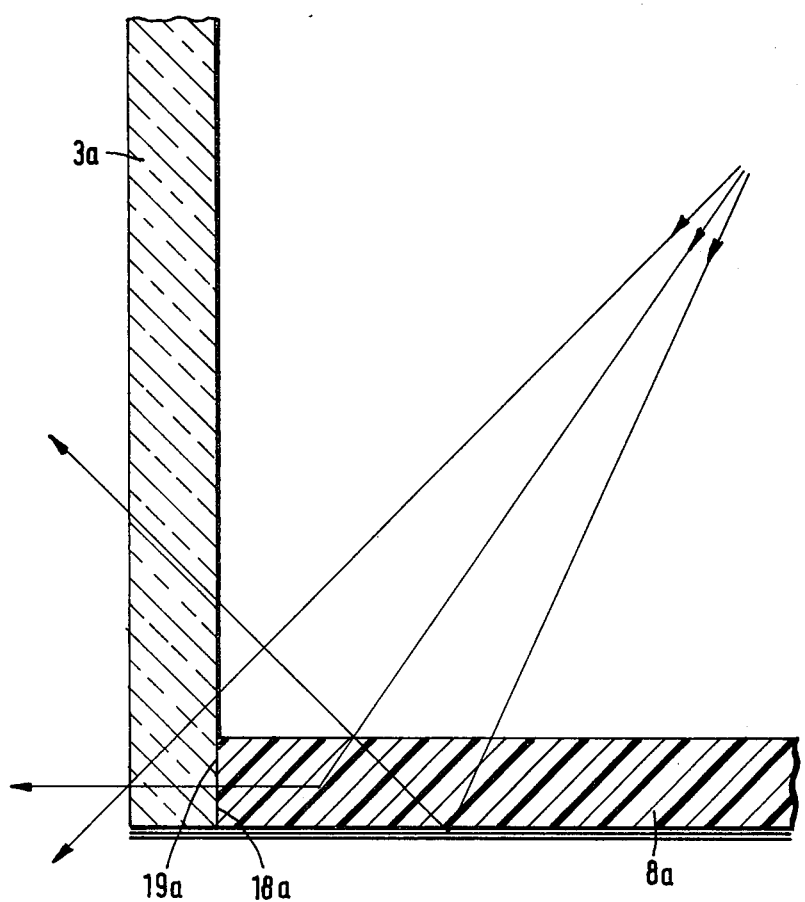
FIG. 4 is a view of a second embodiment according to the invention in a representation corresponding to FIG. 3.

The case walls have in the front bevelled front faces at which the diffuser wall 3 is disposed. The correspondingly inclined edge 19 of the diffuser wall 3 borders the bevelled front face 18 of the wall 8 as is shown in FIG. 3. Thereby the diffuser wall 3 and the case wall are connected by way of a kind of mitre. The adjacently disposed edges are connected to each other by way of a thin, transparent layer of adhesive. The case side walls and the diffuser wall can also be attached to each other by way of a butt joint as is shown in FIG. 4.

Three beams 20 to 22 of the light radiation of the light source 11 are indicated schematically in FIG. 3. The beam 21 passes through the transparent wall 8 up to the layer 16, is there reflected and redirected in accordance with its inclination angle, such that it emerges inclined from the diffuser wall after the side wall reflection. The light beam 22 is refracted in the transparent wall and exits through the bevel connection 18, 19 at a right angle with respect to the front face of the diffuser wall 3 to the outside. Based on this light distribution the diffuser wall 3 is uniformly illuminated up to its outer edges, such that at the edges of the light providing surface no shadow is present.

Since a maximum illuminating surface of the diffuser wall 3 is achieved, the dimensions of the case can be smaller than with the usual light fixtures. In addition, upon disposing several light fixtures according to the invention next to each other and/or above each other a correspondingly larger illuminating surface is produced without interfering shadows. The illumminating surface can have a square, rectangular, hexagonal or polygonal contour, which would allow the sequencing of several lighting fixtures without difficulties. Depending on the purpose of application, the illuminating surface can also have a circular, oval or other shape with curved edge lines. The reflector case can have any desired shape such as for example also like a funnel with circular or cornered cross-section.

It will be understood that each of the elements described above, or two or more together, may also find a useful application in other types of illuminating system configurations and light directing procedures differing from the types described above.

While the invention has been illustrated and described as embodied in the context of a lighting fixture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lighting fixture comprising a light reflecting fixture case having a case wall made of transparent material, which is coated on the outside with a reflecting and opaque covering, and where the case wall is disposed next to an opening to provide light outflow;

light source disposed in the fixture case; and a diffuser wall covering the light outflow, providing opening of the case and attached to the transparent wall such as to join with the edge of the diffuser wall on all sides flush to the case wall and the case wall reaching to at least the outer face of the adjacent transparent case wall.

2. The lighting fixture according to claim 1 wherein the light source is a flash lamp.

3. The lighting fixture according to claim 1 wherein the diffuser wall is attached to the front face of the case wall.

4. The lighting fixture according to claim 3 wherein the diffuser wall is adhesively attached to the front face of the case wall.

5. The lighting fixture according to claim 3 wherein the adjacently disposed faces of the case wall and the diffuser wall are mitred to each other along joint edges.

6. The lighting fixture according to claim 3 wherein the case wall with its front edges makes a butt connection to the inner face of the diffuser wall.

7. The lighting fixture according to claim 1 wherein the case wall comprises a transparent plastic material.

8. The lighting fixture according to claim 1 wherein the diffuser wall comprises a white opal plastic material.

9. The lighting fixture according to claim 1 wherein the outer face of the case wall is provided with a reflecting layer and where this reflecting layer is covered from the outside by an opaque covering layer.

10. The lighting fixture according to claim 9 wherein the reflecting layer and the covering layer are colored layers.

11. The lighting fixture according to claim 10 wherein the reflecting layer and the covering layer are formed by the outer faces of a plastic foil, which is solidly attached to the outer face of the case wall.

* * * * *